United States Patent
Seo et al.

(10) Patent No.: US 9,210,697 B2
(45) Date of Patent: Dec. 8, 2015

(54) METHOD AND DEVICE OF TRANSMITTING A PLURALITY OF RECEPTION CONFIRMATION INFORMATION

(75) Inventors: Dong Youn Seo, Anyang-si (KR); Min Gyu Kim, Anyang-si (KR); Suck Chel Yang, Anyang-si (KR); Joon Kui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 319 days.

(21) Appl. No.: 13/821,965

(22) PCT Filed: Sep. 8, 2011

(86) PCT No.: PCT/KR2011/006665
§ 371 (c)(1),
(2), (4) Date: Mar. 8, 2013

(87) PCT Pub. No.: WO2012/033366
PCT Pub. Date: Mar. 15, 2012

(65) Prior Publication Data
US 2013/0170462 A1    Jul. 4, 2013

Related U.S. Application Data

(60) Provisional application No. 61/381,435, filed on Sep. 9, 2010.

(51) Int. Cl.
*H04W 28/04* (2009.01)
*H04W 28/18* (2009.01)
*H04W 72/04* (2009.01)
*H04L 1/18* (2006.01)
*H04L 1/16* (2006.01)
*H04L 12/28* (2006.01)
*H04L 5/00* (2006.01)

(52) U.S. Cl.
CPC ........ *H04W 72/0413* (2013.01); *H04L 1/1671* (2013.01); *H04L 1/1854* (2013.01); *H04L 1/1861* (2013.01); *H04L 5/0053* (2013.01); *H04L 5/0055* (2013.01); *H04L 5/0094* (2013.01); *H04L 5/0007* (2013.01)

(58) Field of Classification Search
USPC .................................. 370/252, 329, 430, 278
See application file for complete search history.

(56) References Cited

U.S. PATENT DOCUMENTS

2011/0243039 A1* 10/2011 Papasakellariou et al. ... 370/280
2013/0155914 A1*  6/2013 Wang et al. .................. 370/280
2014/0328260 A1* 11/2014 Papasakellariou et al. ... 370/329

FOREIGN PATENT DOCUMENTS

WO    2010/069422    6/2010

OTHER PUBLICATIONS

LG Electronics, "CCE to bundled ACK/NACK index mapping in TDD," 3GPP TSG RAN WG1 #53, R1-081816, May 2008, 6 pages.

(Continued)

*Primary Examiner* — John Pezzlo
(74) *Attorney, Agent, or Firm* — Lee, Hong, Degerman, Kang & Waimey

(57) ABSTRACT

A method and apparatus for transmitting ACK/NACK of a user equipment are provided. The method includes: receiving a first PDCCH and a second PDCCH through at least one serving cell; receiving a first PDSCH scheduled by the first PDCCH; receiving a second PDSCH scheduled by the second PDCCH; allocating a first PUCCH resource on the basis of a lowest index of a CCE on which the first PDCCH is transmitted; allocating a second PUCCH resource on the basis of a lowest index of a CCE on which the second PDCCH is transmitted; and transmitting ACK/NACK for the first PDSCH and the second PDSCH through a serving cell linked to a serving cell receiving the first PDCCH and the second PDCCH, wherein a transmission resource for transmitting the ACK/NACK is selected from the first PUCCH resource and the second PUCCH resource.

15 Claims, 15 Drawing Sheets

(a) PCC: 1CW Tx Mode, SCC: Max 2CW Tx Mode    (b) PCC: Max 2CW Tx Mode, SCC: Max 2CW Tx Mode

(56) References Cited

OTHER PUBLICATIONS

LG Electronics, "Uplink ACK/NACK resource allocation in TDD," 3GPP TSG RAN WG1 #52bis, R1-081257, Mar. 2008, 5 pages.

LG Electronics, "CCE to bundled ACK/NACK index mapping in TDD," 3GPP TSG RAN WG1#53, R1-081816, May 2008, 6 pages.

Korean Intellectual Property Office Application Serial No. 10-2013-7005910, Office Action dated Aug. 12, 2014, 2 pages.

* cited by examiner

FIG. 6

| | Slot 0 | Slot 1 | |
|---|---|---|---|
| $N_{RB}^{UL}-1$ | 2/2a/2b #1 (m=1) | 2/2a/2b #0 (m=0) | |
| $N_{RB}^{UL}-2$ | 1/1a/1b #0 (m=3) | 1/1a/1b+2/2a/2b (m=2) | |
| $N_{RB}^{UL}-3$ | 1/1a/1b #2 (m=5) | 1/1a/1b #1 (m=4) | |
| $N_{RB}^{UL}-4$ | | | |
| $N_{RB}^{UL}-5$ | | | |
| ⋮ | ⋮ | ⋮ | |
| RB 4 | | | |
| RB 3 | | | |
| RB 2 | 1/1a/1b #1 (m=4) | 1/1a/1b #2 (m=5) | |
| RB 1 | 1/1a/1b+2/2a/2b (m=2) | 1/1a/1b #0 (m=3) | |
| RB 0 | 2/2a/2b #0 (m=0) | 2/2a/2b #1 (m=1) | 12 subcarriers |

US 9,210,697 B2

METHOD AND DEVICE OF TRANSMITTING A PLURALITY OF RECEPTION CONFIRMATION INFORMATION

CROSS-REFERENCE TO RELATED APPLICATIONS

This application is the National Stage filing under 35 U.S.C. 371 of International Application No. PCT/KR2011/006665, filed on Sep. 8, 2011, which claims the benefit of U.S. Provisional Application Ser. No. 61/381,435, filed on Sep. 9, 2010, the contents of which are all hereby incorporated by reference herein in their entirety.

TECHNICAL FIELD

The present invention relates to wireless communications, and more particularly, to a method and apparatus for transmitting a plurality of pieces of reception confirmation information by a user equipment which supports aggregation of a plurality of serving cells.

BACKGROUND ART

In order to maximize efficiency of limited radio resources, an effective transmission and reception scheme and various methods of utilization thereof have been proposed in a wireless communication system. A multiple-carrier system is one of systems considered in a next-generation wireless communication system. The multiple-carrier system implies a system which supports a broadband by aggregating one or more carriers having a bandwidth narrower than that of a desired broadband when a wireless communication system intends to support the broadband.

A wireless communication system such as conventional $3^{rd}$ generation partnership project (3GPP) long term evolution (LTE) uses a carrier of various bandwidths, but is a single-carrier system which uses one carrier. Meanwhile, a next-generation wireless communication system such as LTE-A may be a multiple-carrier system which uses a plurality of carriers by aggregating the carriers.

In the multiple-carrier system, a user equipment (UE) can receive a plurality of data units through a plurality of downlink carriers, and can feed back a plurality of pieces of reception confirmation information (i.e., acknowledgement/not-acknowledgement (ACK/NACK)) for the plurality of data units to a base station (BS). In the multiple-carrier system, an amount of ACK/NACK information that must be fed back by the UE may be greater than that of the single-carrier system.

However, the LTE-A specifies that a plurality of ACK/NACK signals are transmitted through a specific uplink carrier. Accordingly, there is a need for a method and apparatus for reliably and effectively transmitting the plurality of ACK/NACK signals.

SUMMARY OF INVENTION

Technical Problem

The present invention provides a method and apparatus for transmitting a plurality of acknowledgement/not-acknowledgement (ACK/NACK) signals in a wireless communication system.

Technical Solution

A method and apparatus for transmitting acknowledgement/not-acknowledgement (ACK/NACK) of a user equipment to which a plurality of serving cells are configured in a wireless communication system are provided. The method includes: receiving a first physical downlink control channel (PDCCH) and a second PDCCH through at least one serving cell among the plurality of serving cells; receiving a first physical downlink shared channel (PDSCH) scheduled by the first PDCCH; receiving a second PDSCH scheduled by the second PDCCH; allocating a first physical uplink control channel (PUCCH) resource on the basis of a lowest index of a control channel element (CCE) on which the first PDCCH is transmitted; allocating a second PUCCH resource on the basis of a lowest index of a CCE on which the second PDCCH is transmitted; and transmitting ACK/NACK for the first PDSCH and the second PDSCH through a serving cell linked to a serving cell receiving the first PDCCH and the second PDCCH, wherein a transmission resource for transmitting the ACK/NACK is selected from the first PUCCH resource and the second PUCCH resource.

Advantageous Effects

According to the present invention, a user equipment can reliably and effectively transmit acknowledgement/not-acknowledgement (ACK/NACK) for a data unit received in a plurality of serving cells.

DESCRIPTION OF DRAWINGS

FIG. 6 shows physical mapping of a physical uplink control channel (PUCCH) format and a control region.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with an IEEE 802.16e-based system. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is evolved from the LTE. Although the following description focuses on LTE and LTE-A for clarity, the technical features of the present invention are not limited thereto.

Figure 1:
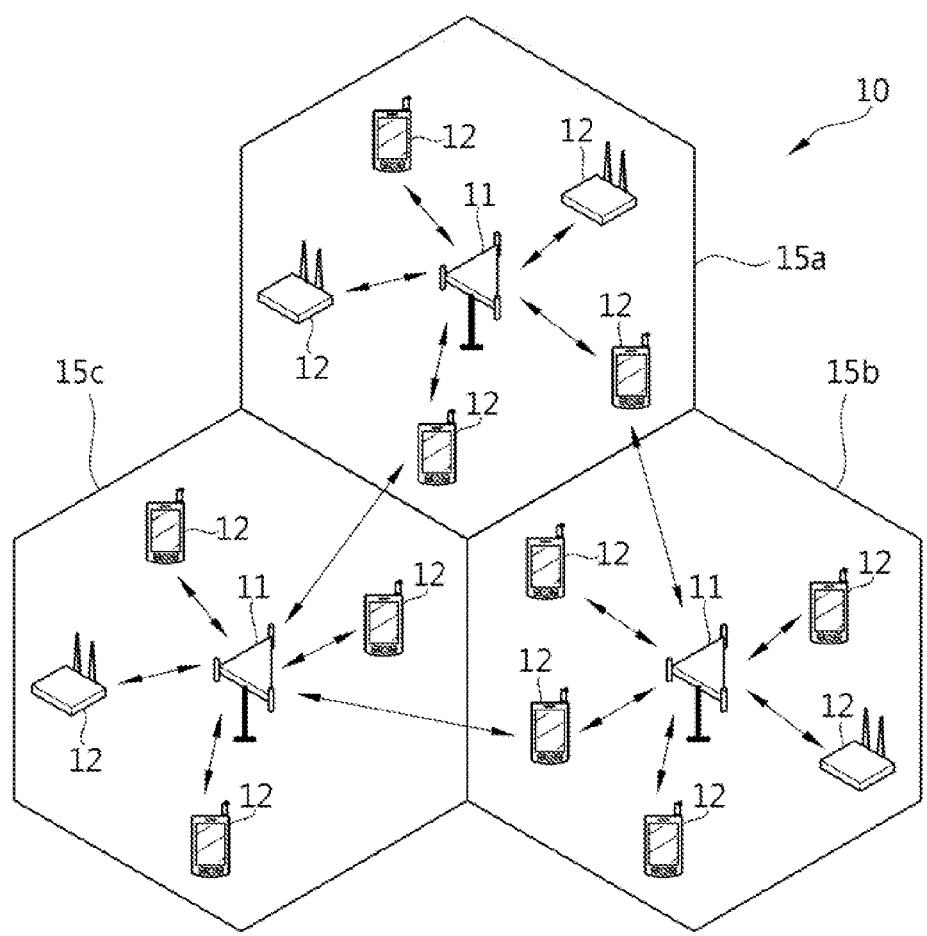
FIG. 1 shows a wireless communication system.

FIG. 1 shows a wireless communication system.

Referring to FIG. 1, a wireless communication system 10 includes at least one base station (BS) 11. Respective BSs 11 provide communication services to specific geographical regions 15a, 15b, and 15c. A user equipment (UE) 12 may be fixed or mobile, and may be referred to as another terminology, such as a mobile station (MS), an mobile terminal (MT), a user terminal (UT), a subscriber station (SS), a wireless device, a personal digital assistant (PDA), a wireless modem, a handheld device, etc.

The BS 11 is generally a fixed station that communicates with the UE 12 and may be referred to as another terminology, such as an evolved node-B (eNB), a base transceiver system (BTS), an access point, etc.

Hereinafter, a downlink implies communication from the BS 11 to the UE 12, and an uplink implies communication from the UE 12 to the BS 11. A wireless communication system can be briefly classified into a system based on a frequency division duplex (FDD) scheme and a system based on a time division duplex (TDD) scheme. In the FDD scheme, uplink transmission and downlink transmission are achieved while occupying different frequency bands. In the TDD scheme, uplink transmission and downlink transmission are achieved at different times while occupying the same frequency band FIG. 2 shows a structure of a radio frame in 3GPP LTE.

Figure 2:
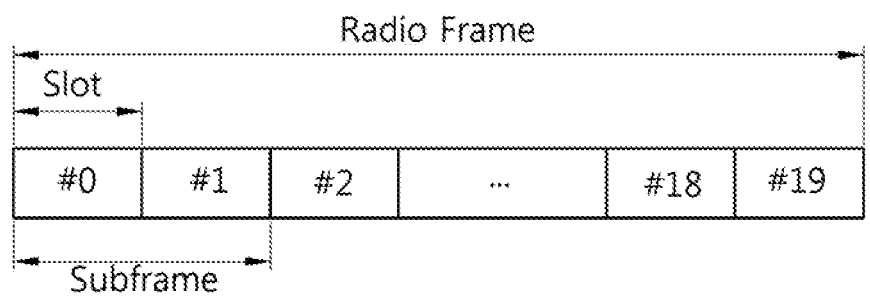
FIG. 2 shows a structure of a radio frame in $3^{rd}$ generation partnership project (3GPP) long term evolution (LTE).

Referring to FIG. 2, the radio frame consists of 10 subframes. One subframe consists of two slots. Slots included in the radio frame are numbered with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

One slot includes a plurality of orthogonal frequency division multiplexing (OFDM) symbols in a time domain, and includes a plurality of subcarriers in a frequency domain. Since the 3GPP LTE uses OFDMA in downlink (DL) transmission, the OFDM symbol is for representing one symbol period, and can be referred to as other terms. For example, the OFDM symbol can also be referred to as an SC-FDMA symbol when SC-FDMA is used as an uplink (UL) multiple-access scheme.

In 3GPP LTE, it is defined such that one slot includes 7 OFDM symbols in a normal cyclic prefix (CP) case and one slot includes 6 OFDM symbols in an extended CP case.

Figure 3:
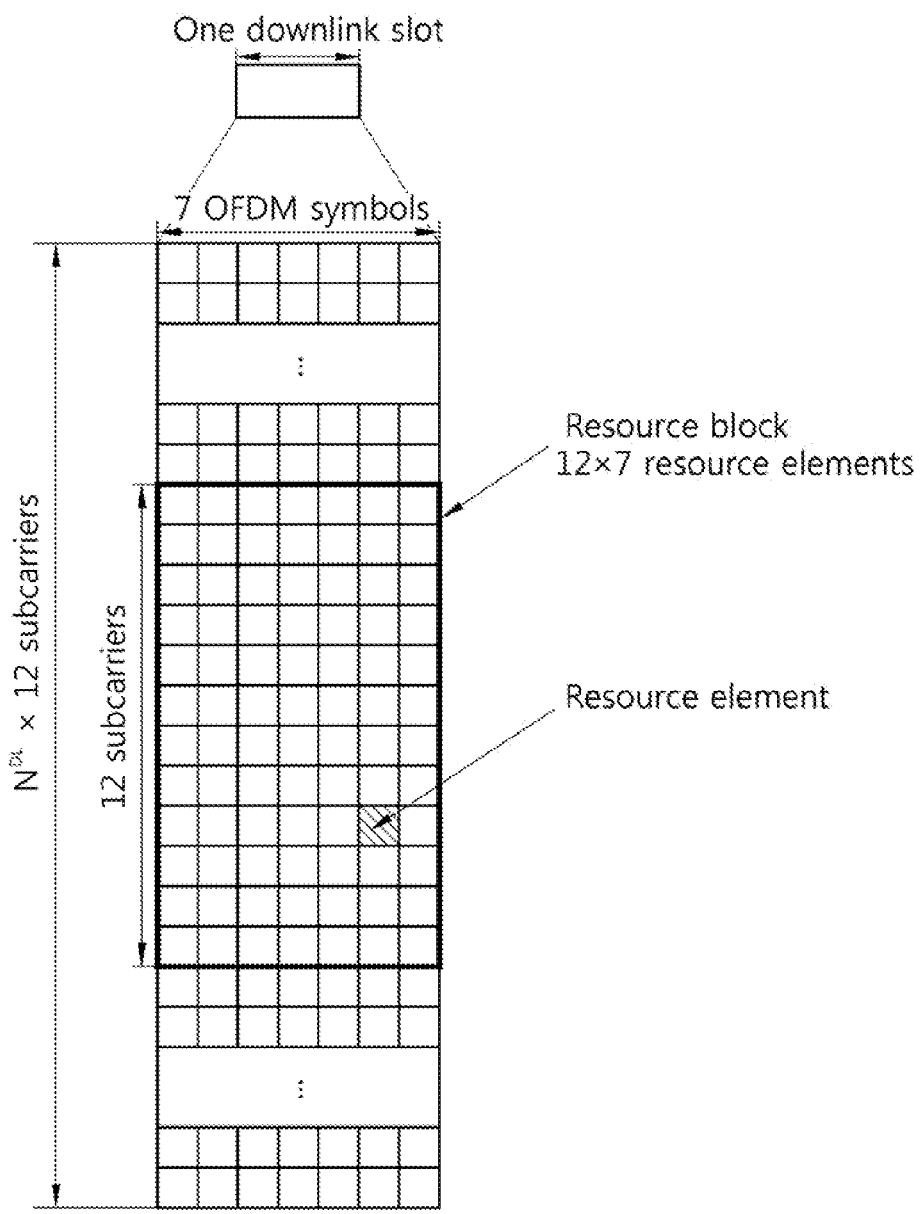
FIG. 3 shows an example of a resource grid for one downlink (DL) slot.

FIG. 3 shows an example of a resource grid for one DL slot.

The DL slot includes a plurality of orthogonal frequency division multiplexing (OFDM) symbols in a time domain, and includes $N_{RB}$ resource blocks (RBs) in a frequency domain. The RB includes a plurality of consecutive subcarriers in one slot in a unit of resource allocation. Although it is described herein that one RB consists of 7 OFDM symbols in the time domain and 12 subcarriers in the frequency domain for example, the present invention is not limited thereto. The number of OFDM symbols in the RB and the number of subcarriers may change variously depending on a CP length, a frequency spacing, etc. For example, the number of OFDM symbols is 7 in a normal CP case, and the number of OFDM symbols is 6 in an extended CP case. The number of subcarriers in one OFDM symbol may be one value selected from 128, 256, 512, 1024, 1536, and 2048. The number $N_{RB}$ of RBs included in the DL slot depends on a DL transmission bandwidth configured in a cell. For example, in the LTE system, $N_{RB}$ may be any one value in the range of 60 to 110.

Each element on the resource grid is referred to as a resource element (RE). The RE can be identified by an index pair (k,l) within the slot. Herein, $k(k=0, \ldots, N_{RB} \times 12-1)$ denotes a subcarrier index, and $l(l=0, \ldots, 6)$ denotes an OFDM symbol index.

A structure of a UL slot may be the same as the aforementioned structure of the DL slot.

Figure 4:
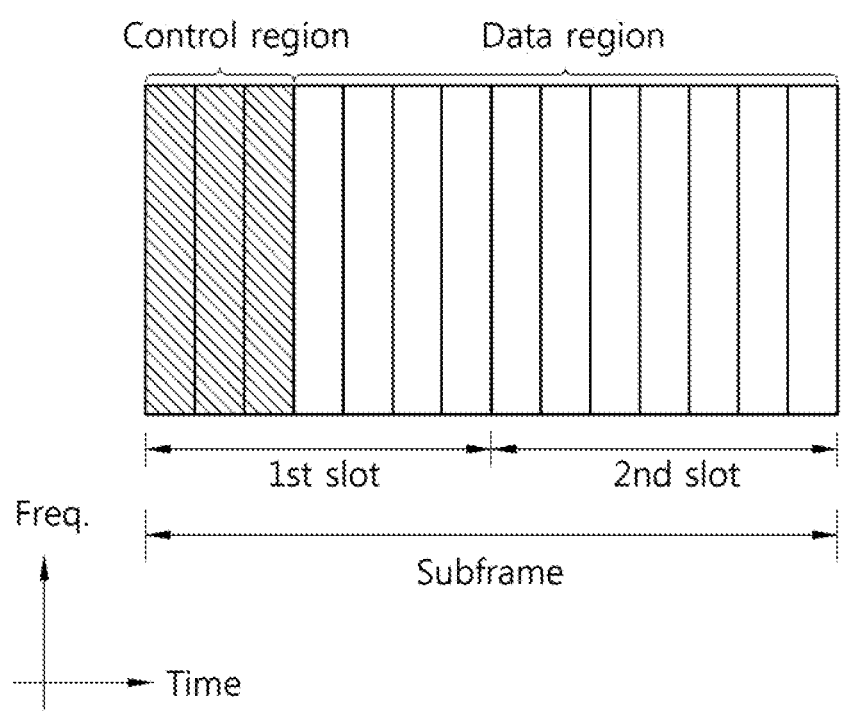
FIG. 4 shows an exemplary structure of a DL subframe.

FIG. 4 shows an exemplary structure of a DL subframe.

The DL subframe includes two slots in a time domain, and each slot includes 7 OFDM symbols in a normal CP. Up to three preceding OFDM symbols (i.e., in case of 1.4 MHz bandwidth, up to 4 OFDM symbols) of a first slot within the subframe correspond to a control region, and the remaining OFDM symbols correspond to a data region. Herein, control channels are allocated to the control region, and a physical downlink shared channel (PDSCH) is allocated to the data region.

A physical downlink control channel (PDCCH) can carry a downlink shared channel (DL-SCH)'s resource allocation and transmission format, uplink shared channel (UL-SCH)'s resource allocation information, paging information on a PCH, system information on a DL-SCH, a resource allocation of a higher layer control message such as a random access response transmitted through a PDSCH, a transmission power control command for individual UEs included in any UE group, activation of a voice over Internet (VoIP), etc. Control information transmitted through the PDCCH is referred to as downlink control information (DCI).

A plurality of PDCCHs can be transmitted in the control region, and the UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level. A format of the PDCCH and the number of bits of the available PDCCH are determined according to a correlation between the number of CCEs and the coding rate provided by the CCEs.

A BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for a system information block (SIB), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 5:
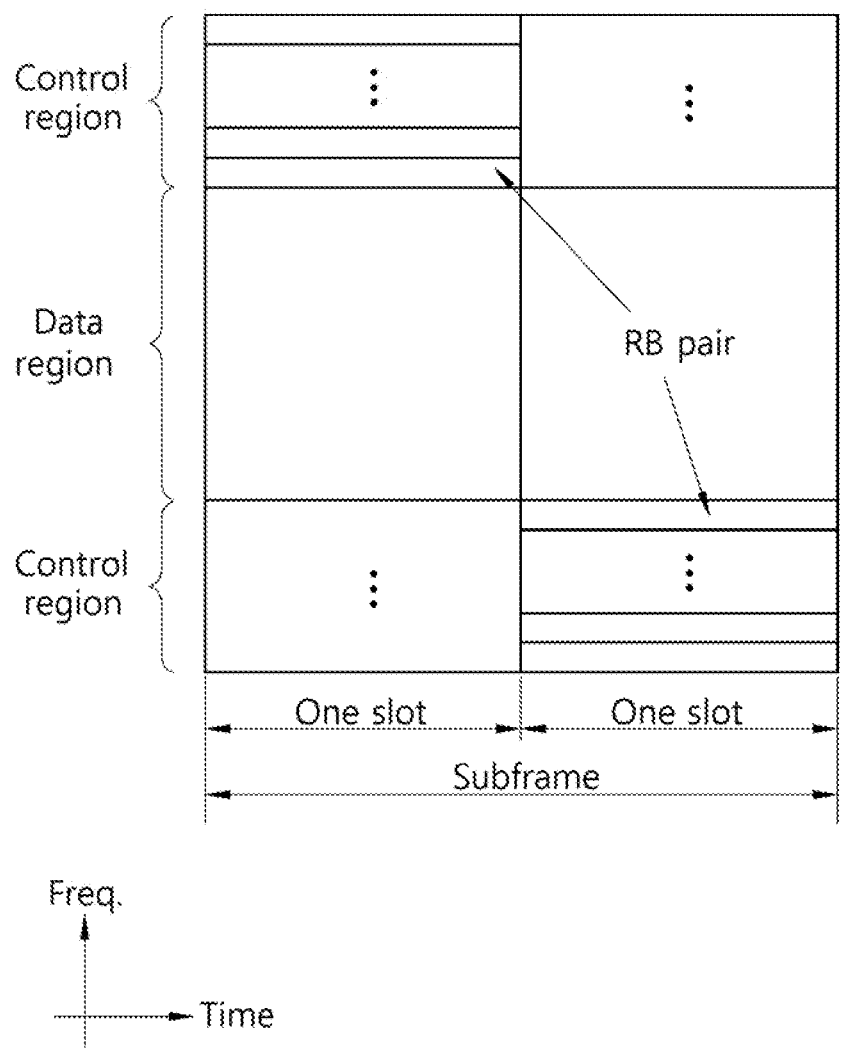
FIG. 5 shows a structure of an uplink (UL) subframe.

FIG. 5 shows a structure of a UL subframe.

The UL subframe can be divided into a control region and a data region. A physical uplink control channel (PUCCH) for carrying uplink control information (UCI) is allocated to the control region. A physical uplink shared channel (PUSCH) for carrying UL data and/or the UCI is allocated to the data region. In this sense, the control region can be called a PUCCH region, and the data region can be called a PUSCH region. According to configuration information indicated by a higher layer, a UE may support simultaneous transmission of the PUSCH and the PUCCH or may not support simultaneous transmission of the PUSCH and the PUCCH.

The PUSCH is mapped to an uplink shared channel (UL-SCH) which is a transport channel. UL data transmitted on the PUSCH may be a transport block which is a data block for the UL-SCH transmitted during TTI. Alternatively, the UL data may be multiplexed data. The multiplexed data may be attained by multiplexing control information and the transport block for the UL-SCH. Examples of the UCI to be multiplexed include a channel quality indicator (CQI), a precoding matrix indicator (PMI), a hybrid automatic repeat request (HARQ) acknowledgement/not-acknowledgement (ACK/NACK), a rank indicator (RI), a precoding type indication (PTI), etc. Only the UCI may be transmitted through the PUSCH.

The PUCCH for one UE is allocated in an RB pair in a subframe. RBs belonging to the RB pair occupy different subcarriers in each of a $1^{st}$ slot and a $2^{nd}$ slot. A frequency occupied by the RBs belonging to the RB pair changes at a slot boundary. This is called that the RB pair allocated to the PUCCH is frequency-hopped at the slot boundary. Since the UE transmits UCI on a time basis through different subcarriers, a frequency diversity gain can be obtained.

The PUCCH carries various types of control information according to a format. A PUCCH format 1 carries a scheduling request (SR). In this case, an on-off keying (OOK) scheme can be used. A PUCCH format 1a carries an acknowledgement/non-acknowledgement (ACK/NACK) modulated using bit phase shift keying (BPSK) with respect to one codeword. A PUCCH format 1b carries an ACK/NACK modulated using quadrature phase shift keying (QPSK) with respect to two codewords. A PUCCH format 2 carries a channel quality indicator (CQI) modulated using QPSK. PUCCH formats 2a and 2b carry CQI and ACK/NACK. A PUCCH format 3 is modulated using QPSK, and can carry a plurality of ACK/NACK signals and an SR.

Table 1 shows a modulation scheme and the number of bits in a subframe according to a PUCCH format.

TABLE 1

| PUCCH format | Modulation scheme | Number of bits per subframe, $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

FIG. 6 shows physical mapping of a PUCCH format and a control region.

Referring to FIG. 6, the PUCCH formats 2/2a/2b are mapped and transmitted on band-edge RBs (e.g., PUCCH region m=0, 1). A mixed PUCCH RB can be transmitted by being mapped to an adjacent RB (e.g., m=2) towards a center of the band in an RB to which the PUCCH formats 2/2a/2b are allocated. PUCCH formats 1/1a/1b by which SR and ACK/NACK are transmitted can be deployed to an RB (e.g., m=4 or m=5).

All PUCCH formats use a cyclic shift (CS) of a sequence in each OFDM symbol. The cyclically shifted sequence is generated by cyclically shifting a base sequence by a specific CS amount. The specific CS amount is indicated by a CS index.

An example of a base sequence $r_u(n)$ is defined by Equation 1 below.

$$r_u(n) = e^{jb(n)\pi/4} \quad \text{[Equation 1]}$$

In Equation 1, u denotes a root index, and n denotes a component index in the range of $0 \le n \le N-1$, where N is a length of the base sequence. b(n) is defined in the section 5.5 of 3GPP TS 36.211 V8.7.0.

A length of a sequence is equal to the number of elements included in the sequence. u can be determined by a cell identifier (ID), a slot number in a radio frame, etc. When it is assumed that the base sequence is mapped to one RB in a frequency domain, the length N of the base sequence is 12 since one RB includes 12 subcarriers. A different base sequence is defined according to a different root index.

The base sequence r(n) can be cyclically shifted by Equation 2 below to generate a cyclically shifted sequence $r(n, I_{cs})$.

$$r(n, I_{cs}) = r(n) \cdot \exp\left(\frac{j2\pi I_{cs} n}{N}\right), \quad \text{[Equation 2]}$$
$$0 \le I_{cs} \le N-1$$

In Equation 2, $I_{cs}$ denotes a CS index indicating a CS amount ($0 \le I_{cs} \le N-1$).

Hereinafter, the available CS of the base sequence denotes a CS index that can be derived from the base sequence according to a CS interval. For example, if the base sequence has a length of 12 and the CS interval is 1, the total number of available CS indices of the base sequence is 12. Alternatively, if the base sequence has a length of 12 and the CS interval is 2, the total number of available CS indices of the base sequence is 6.

Now, transmission of an HARQ ACK/NACK signal in PUCCH formats 1a/1b will be described.

Figure 7:
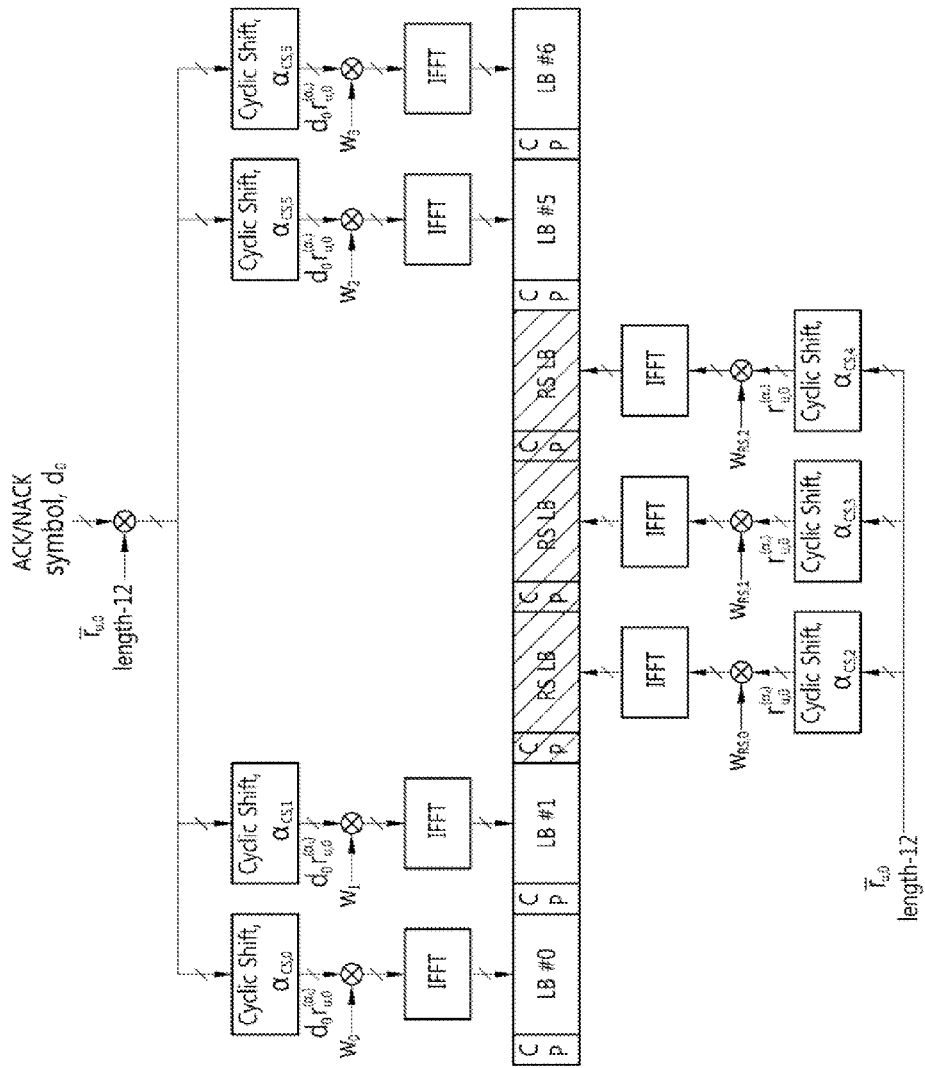
FIG. 7 shows a PUCCH format 1b in 3GPP LTE in a normal cyclic prefix (CP) case.

FIG. 7 shows a PUCCH format 1b in 3GPP LTE in a normal CP case.

One slot includes 7 OFDM symbols. Three OFDM symbols are used as reference signal (RS) OFDM symbols for a reference signal. Four OFDM symbols are used as data OFDM symbols for an ACK/NACK signal.

In the PUCCH format 1b, a modulation symbol d(0) is generated by modulating a 2-bit ACK/NACK signal based on quadrature phase shift keying (QPSK).

A CS index $I_{cs}$ may vary depending on a slot number $n_s$ in a radio frame and/or a symbol index l in a slot.

In the normal CP, there are four data OFDM symbols for transmission of an ACK/NACK signal in one slot. It is assumed that CS indices mapped to the respective data OFDM symbols are denoted by $I_{cs0}$, $I_{cs1}$, $I_{cs2}$, and $I_{cs3}$.

The modulation symbol d(0) is spread to a cyclically shifted sequence $r(n, I_{cs})$. When a one-dimensional spreading sequence mapped to an (i+1)$^{th}$ OFDM symbol in a subframe is denoted by m(i), it can be expressed as follows.

$$\{m(0),m(1),m(2),m(3)\}=\{d(0)r(n,I_{cs0}),d(0)r(n,I_{cs1}),d(0)r(n,I_{cs2}),d(0)r(n,I_{cs3})\}$$

In order to increase UE capacity, the one-dimensional spreading sequence can be spread by using an orthogonal sequence. An orthogonal sequence $w_i(k)$ (where i is a sequence index, $0 \leq k \leq K-1$) having a spread factor K=4 uses the following sequence.

TABLE 2

| Index (i) | [$w_i(0)$, $w_i(1)$, $w_i(2)$, $w_i(3)$] |
|---|---|
| 0 | [+1, +1, +1, +1] |
| 1 | [+1, −1, +1, −1] |
| 2 | [+1, −1, −1, +1] |

An orthogonal sequence $w_i(k)$ (where i is a sequence index, $0 \leq k \leq K-1$) having a spread factor K=3 uses the following sequence.

TABLE 3

| Index (i) | [$w_i(0)$, $w_i(1)$, $w_i(2)$] |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spread factor can be used for each slot.

Therefore, when any orthogonal sequence index i is given, two-dimensional spreading sequences {s(0), s(1), s(2), s(3)} can be expressed as follows.

$$\{s(0),s(1),s(2),s(3)\}=\{w_i(0)m(0),w_i(1)m(1),w_i(2)m(2),w_i(3)m(3)\}$$

The two-dimensional spreading sequences {s(0), s(1), s(2), s(3)} are subjected to inverse fast Fourier transform (IFFT) and thereafter are transmitted in corresponding OFDM symbols. Accordingly, an ACK/NACK signal is transmitted on a PUCCH.

A reference signal of the PUCCH format 1b is also transmitted by cyclically shifting the base sequence r(n) and then by spreading it by the use of an orthogonal sequence. When CS indices mapped to three RS OFDM symbols are denoted by $I_{cs4}$, $I_{cs5}$, and $I_{cs6}$, three cyclically shifted sequences r(n, $I_{cs4}$), r(n, $I_{cs5}$), and r(n, $I_{cs6}$) can be obtained. The three cyclically shifted sequences are spread by the use of an orthogonal sequence $w^{RS}_i(k)$ having a spreading factor K=3.

An orthogonal sequence index i, a CS index $I_{cs}$, and a resource block index m are parameters required to configure the PUCCH, and are also resources used to identify the PUCCH (or UE). If the number of available cyclic shifts is 12 and the number of available orthogonal sequence indices is 3, PUCCHs for 36 UEs in total can be multiplexed to one resource block.

In the 3GPP LTE, a resource index $n^{(1)}_{PUUCH}$ is defined in order for the UE to obtain the three parameters for configuring the PUCCH. $n^{(1)}_{PUCCH}$ is also called a PUCCH index. The resource index $n^{(1)}_{PUUCH}$ is defined to $n_{CCE}+N^{(1)}_{PUUCH}$, where $n_{CCE}$ is an index of a first CCE used for transmission of corresponding DCI (i.e., DL resource allocation used to receive DL data mapped to an ACK/NACK signal), and $N^{(1)}_{PUUCH}$ is a parameter reported by a BS to the UE by using a higher-layer message.

Time, frequency, and code resources used for transmission of the ACK/NACK signal are referred to as ACK/NACK resources or PUCCH resources. As described above, an index of a PUCCH resource or the ACK/NACK resource required to transmit the ACK/NACK signal on the PUCCH can be expressed with at least any one of an orthogonal sequence index i, a CS index $I_{cs}$, a resource block index m, and an index for obtaining the three indices.

Figure 8:
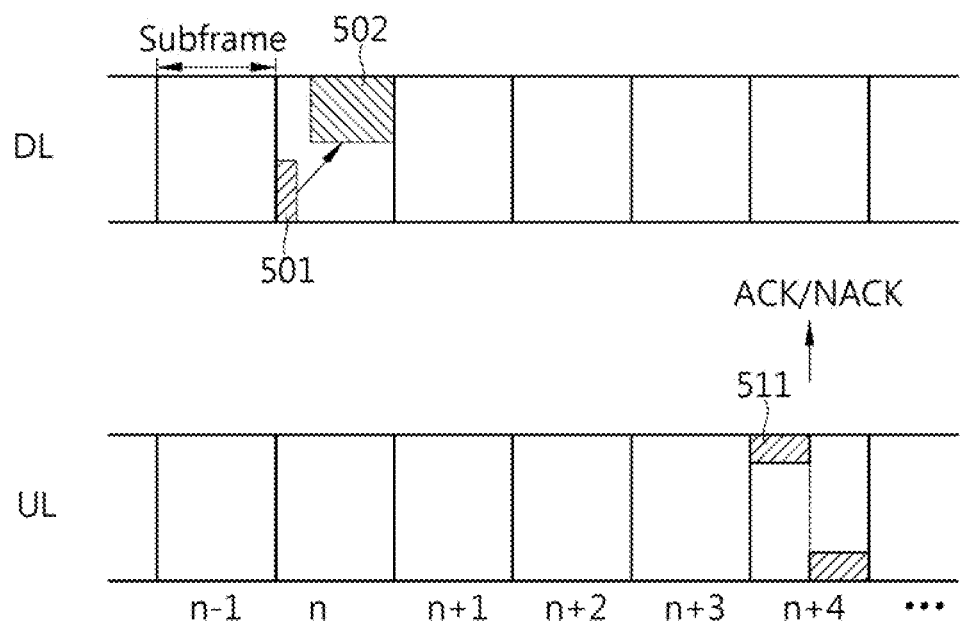
FIG. 8 shows an example of performing hybrid automatic repeat request (HARQ).

FIG. 8 shows an example of performing HARQ.

By monitoring a PDCCH, a UE receives a DL resource allocation (or a DL grant) on a PDCCH 501 in an n$^{th}$ DL subframe. The UE receives a DL transport block through a PDSCH 502 indicated by the DL resource allocation.

The UE transmits an ACK/NACK signal for the DL transport block on a PUCCH 511 in an (n+4)$^{th}$ UL subframe. The ACK/NACK signal can be regarded as reception acknowledgement information for a DL transport block.

The ACK/NACK signal corresponds to an ACK signal when the DL transport block is successfully decoded, and corresponds to a NACK signal when the DL transport block fails in decoding. Upon receiving the NACK signal, a BS may retransmit the DL transport block until the ACK signal is received or until the number of retransmission attempts reaches its maximum number.

In 3GPP LTE, to configure a resource index for the PUCCH 511, the UE uses a resource allocation of the PDCCH 501. That is, a lowest CCE index (or an index of a first CCE) used for transmission of the PDCCH 501 is $n_{CCE}$, and the resource index is determined as $n^{(1)}_{PUUCH}=n_{CCE}+N^{(1)}_{PUUCH}$. As such, the PUCCH resource can be implicitly determined.

Now, a multiple-carrier system will be described.

A 3GPP LTE system supports a case in which a DL bandwidth and a UL bandwidth are differently configured under the premise that one component carrier (CC) is used. The 3GPP LTE system supports up to 20 MHz, and the UL bandwidth and the DL bandwidth may be different from each other. However, only one CC is supported in each of UL and DL cases.

Carrier aggregation (CA) (also referred to as spectrum aggregation or bandwidth aggregation) supports a plurality of CCs. For example, if 5 CCs are assigned as a granularity of a carrier unit having a bandwidth of 20 MHz, a bandwidth of up to 100 MHz can be supported.

A system band of a wireless communication system is divided into a plurality of carrier frequencies. Herein, the carrier frequency implies a center frequency of a cell. Hereinafter, the cell may imply a pair of a DL CC and a UL CC. Alternatively, the cell may also imply a combination of a DL CC and an optional UL CC.

In order to transmit and receive a transport block through a specific cell, the UE first has to complete configuration of the specific cell. Herein, the configuration implies a state of completely receiving system information required for data transmission and reception for the cell. For example, the configuration may include an overall procedure for receiving common physical layer parameters necessary for data transmission and reception, MAC layer parameters, or parameters necessary for a specific operation in an RRC layer.

The cell in a state of completing its configuration can exist in an activation or deactivation state. Herein, the activation implies that data transmission or reception is performed or is in a ready state. The UE can monitor or receive a control channel (i.e., PDCCH) and a data channel (i.e., PDSCH) of an activated cell in order to confirm a resource (e.g., frequency, time, etc.) allocated to the UE.

The deactivation implies that data transmission or reception is impossible and measurement or transmission/reception of minimum information is possible. The UE can receive system information (SI) required to receive a packet from a deactivated cell. On the other hand, in order to confirm the resource (e.g., frequency, time, etc.) allocated to the UE, the UE does not monitor or receive a control channel (i.e., PDCCH) and a data channel (i.e., PDSCH) of the deactivated cell.

A cell can be classified into a primary cell, a secondary cell, a serving cell, etc.

The primary cell implies a cell that operates at a primary frequency. Further, the primary cell implies a cell in which the UE performs an initial connection establishment procedure or a connection re-establishment procedure with respect to the BS or a cell indicated as the primary cell in a handover procedure.

The secondary cell implies a cell that operates at a secondary frequency. Once an RRC connection is established, the secondary cell is used to provide an additional radio resource.

The serving cell is configured with the primary cell in case of a UE of which carrier aggregation is not configured or which cannot provide the carrier aggregation. If the carrier aggregation is configured, the term 'serving cell' is used to indicate a set consisting of one or a plurality of cells among primary cells or all secondary cells.

A set of serving cells configured only for one UE may consist of only one primary cell, or may consist of one primary cell and at least one secondary cell.

A primary component carrier (PCC) denotes a CC corresponding to the primary cell. The PCC is a CC that establishes an initial connection (or RRC connection) with the BS among several CCs. The PCC serves for connection (or RRC connection) for signaling related to a plurality of CCs, and is a CC that manages UE context which is connection information related to the UE. In addition, the PCC establishes a connection with the UE, and thus always exists in an activation state when in an RRC connected mode. A DL CC corresponding to the primary cell is called a DL primary component carrier (DL PCC), and a UL CC corresponding to the primary cell is called a UL primary component carrier (UL PCC).

A secondary component carrier (SCC) implies a CC corresponding to the secondary cell. The SCC is a CC allocated to the UE in addition to the PCC. The SCC is an extended carrier used by the UE for additional resource allocation or the like in addition to the PCC, and can operate either in an activation state or a deactivation state. A DL CC corresponding to the secondary cell is called a DL secondary CC (DL SCC), and a UL CC corresponding to the secondary cell is called a UL secondary CC (UL SCC).

The primary cell and the secondary cell have the following features.

First, the primary cell is used for PUCCH transmission. Second, the primary cell is always activated, whereas the secondary cell relates to a carrier which is activated/deactivated according to a specific condition. Third, when the primary cell experiences a radio link failure (RLF), RRC reconnection is triggered, whereas when the secondary cell experiences the RLF, the RRC re-connection is not triggered. Fourth, the primary cell can change by a handover procedure accompanied by a random access channel (RACH) procedure or security key modification. Fifth, non-access stratum (NAS) information is received through the primary cell. Sixth, the primary cell always consists of a pair of a DL PCC and a UL PCC. Seventh, for each UE, a different CC can be configured as the primary cell. Eighth, a procedure such as reconfiguration, adding, and removal of the primary cell can be performed by an RRC layer. When adding a new secondary cell, RRC signaling can be used for transmission of system information of a dedicated secondary cell.

Regarding a CC constructing a serving cell, a DL CC can construct one serving cell, or the DL CC can be connected to a UL CC to construct one serving cell. However, the serving cell is not constructed only with one UL CC.

Activation/deactivation of a CC is equivalent in concept to activation/deactivation of a serving cell. For example, if it is assumed that a serving cell 1 consists of a DL CC 1, activation of the serving cell 1 implies activation of the DL CC 1. If it is assumed that a serving cell 2 is configured by connecting a DL CC 2 and a UL CC 2, activation of the serving cell 2 implies activation of the DL CC 2 and the UL CC 2. In this sense, each CC can correspond to a cell.

Figure 9:
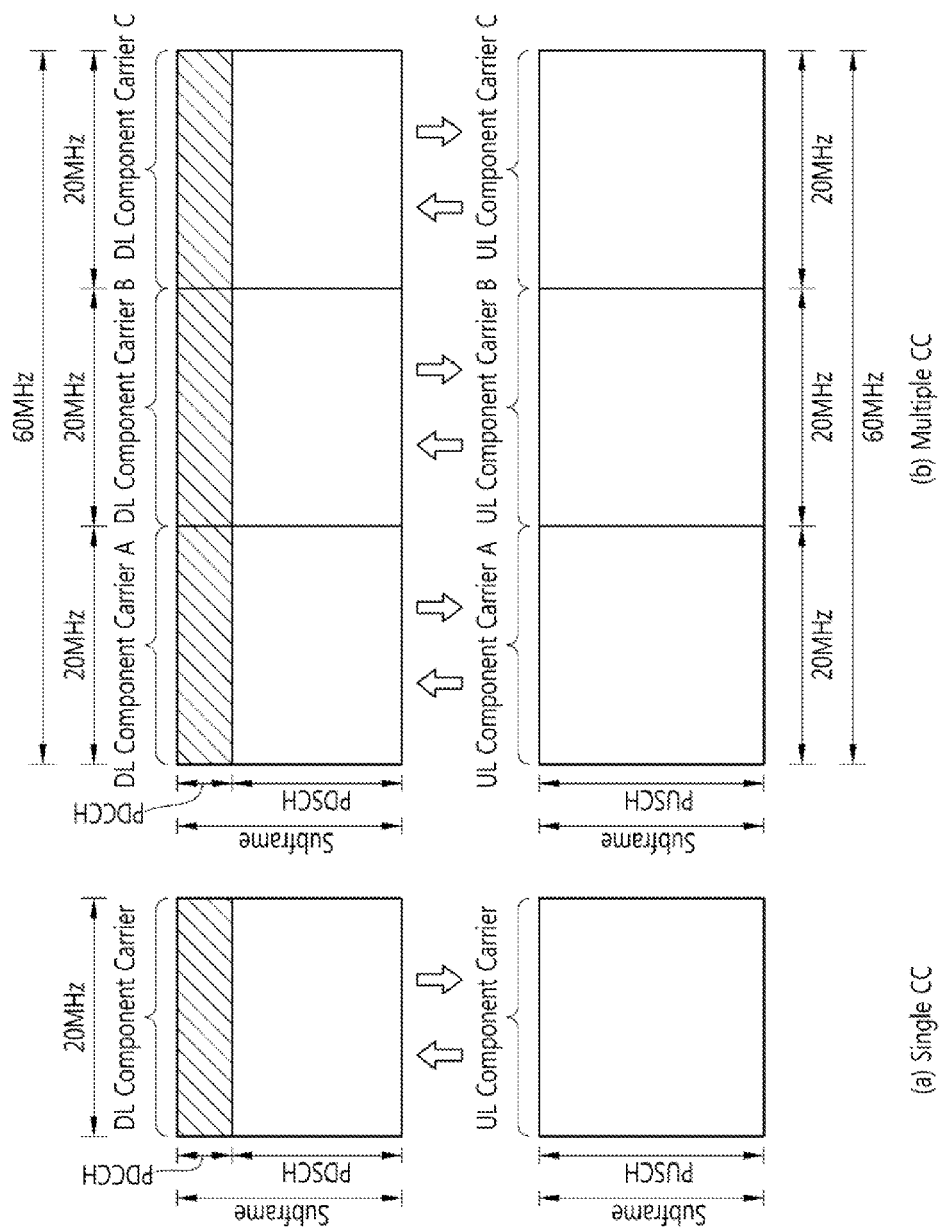
FIG. 9 shows an example of comparing a single-carrier system and a multiple-carrier system.

FIG. 9 shows an example of comparing a single-carrier system and a multiple-carrier system.

Referring to FIG. 9(a), only one carrier is supported for a UE in an uplink and a downlink in the single-carrier system. The carrier may have various bandwidths, but only one carrier is assigned to the UE. Meanwhile, multiple CCs, i.e., DL CCs A to C and UL CCs A to C, can be assigned to the UE in the multiple-carrier system of FIG. 9(b). For example, three 20 MHz CCs can be assigned to allocate a 60 MHz bandwidth to the UE. Although three DL CCs and three UL CCs are shown FIG. 9(b), the number of DL CCs and the number of UL CCs are not limited thereto. A PDCCH and a PDSCH are independently transmitted in each DL CC. A PUCCH and a PUSCH are independently transmitted in each UL CC. Since three DL CC-UL CC pairs are defined, it can be said that the UE receives a service from three serving cells.

The UE can monitor the PDCCH in a plurality of DL CCs, and can receive a DL transport block simultaneously via the plurality of DL CCs. The UE can transmit a plurality of UL transport blocks simultaneously via a plurality of UL CCs.

Two CC scheduling methods are possible in the multiple-carrier system.

First, a PDCCH-PDSCH pair is transmitted in one CC. This CC is called self-scheduling. In addition, this implies that a UL CC in which a PUSCH is transmitted is a CC linked to a DL CC in which a corresponding PDCCH is transmitted. That is, the PDCCH allocates a PDSCH resource on the same CC, or allocates a PUSCH resource on a linked UL CC.

Second, a DL CC in which the PDSCH is transmitted or a UL CC in which the PUSCH is transmitted is determined irrespective of a DL CC in which the PDCCH is transmitted. That is, the PDCCH and the PDSCH are transmitted in different DL CCs, or the PUSCH is transmitted through a UL CC which is not linked to the DL CC in which the PDSCH is transmitted. This is called cross-carrier scheduling. A CC in which the PDCCH is transmitted is called a PDCCH carrier, a monitoring carrier, or a scheduling carrier. A CC in which the PDSCH/PUSCH is transmitted is called a PDSCH/PUSCH carrier or a scheduled carrier.

Figure 10:
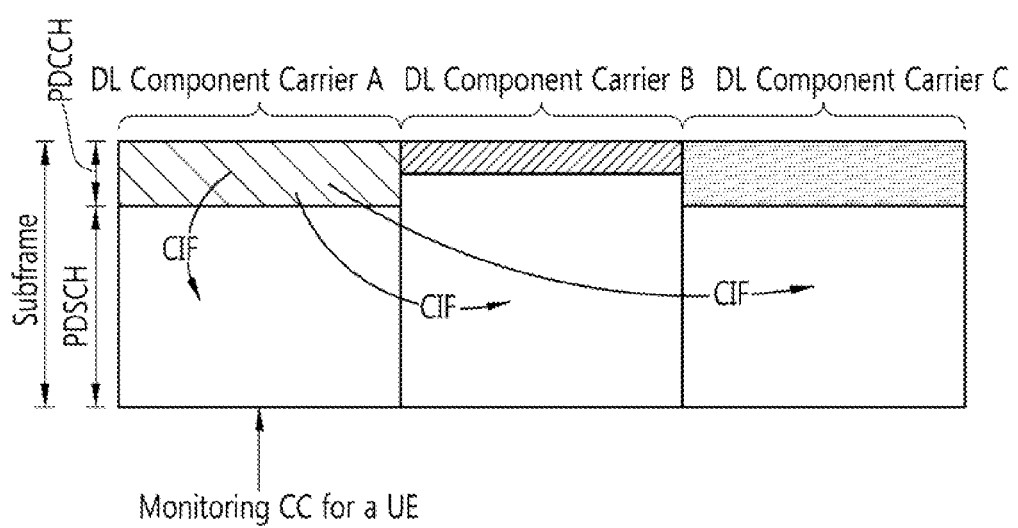
FIG. 10 shows an example of cross-carrier scheduling.

FIG. 10 shows an example of cross-carrier scheduling.

Referring to FIG. 10, three DL CCs (i.e., DL CC A, DL CC B, and DL CC C) are configured to a UE. Among them, the DL CC A is a monitoring CC in which the UE monitors a PDCCH. The UE receives downlink control information (DCI) for the DL CC A, the DL CC B, and the DL CC C in a PDCCH of the DL CC A. Since a CIF is included in the DCI, the UE can identify to which DL CC the DCI belongs. The monitoring CC may be a DL PCC. Such a monitoring CC can be configured in a UE-specific manner or a UE group-specific manner.

There may be a case where the UE must simultaneously transmit a plurality of ACK/NACK signals for a plurality of data units received from the BS. In this case, in order to maintain a single-carrier property of the ACK/NACK signal and to decrease transmission power of the ACK/NACK signal, ACK/NACK multiplexing based on PUCCH resource selection can be used. In the ACK/NACK multiplexing, ACK/NACK contents are determined by combining a QPSK modulation symbol and a PUCCH resource used in ACK/NACK transmission. Table 4 below shows an example of ACK/NACK multiplexing based on PUCCH resource selection.

TABLE 4

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,2}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 4, HARQ-ACK(i) denotes ACK/NACK for a data unit i (i=0, 1, 2, 3). The data unit may imply a codeword, a transmission block, or a PDSCH. DTX indicates that a receiving end fails to detect a presence of the data unit. $n^{(1)}_{PUCCH,X}$ denotes a PUCCH resource used in ACK/NACK transmission. In Table 4, x is any one of values 0, 1, 2, and 3. The UE transmits 2-bit (i.e., b(0) and b(1)) information identified by a QPSK modulation symbol in one PUCCH resource selected from a plurality of allocated PUCCH resources. Then, the BS can know whether each data unit is successfully received by using a combination of the QPSK modulation symbol and a PUCCH resource used for actual ACK/NACK transmission. For example, if the UE successfully receives 4 data units and then decodes the data units, the UE transmits 2 bits (i.e., (1, 1)) by using $n^{(1)}_{PUCCH,1}$.

The aforementioned ACK/NACK multiplexing based on PUCCH resource selection can be used both in TDD and FDD. The following description is about how to allocate a PUCCH resource in the ACK/NACK multiplexing and, if ACK/NACK is transmitted by using transmit diversity, how to allocate a PUCCH resource in case of using a multiple-carrier system. First, how to allocate the PUCCH resource in ACK/NACK multiplexing in case of using the multiple-carrier system will be described.

A PUCCH resource allocated in ACK/NACK multiplexing is implicitly mapped to a lowest CCE index $n_{CCE}$ of a PDCCH which schedules a PDSCH transmitted in each CC, and the number of PUCCH resources to be allocated can be determined according to a transmit (Tx) mode of each CC.

Figure 11:
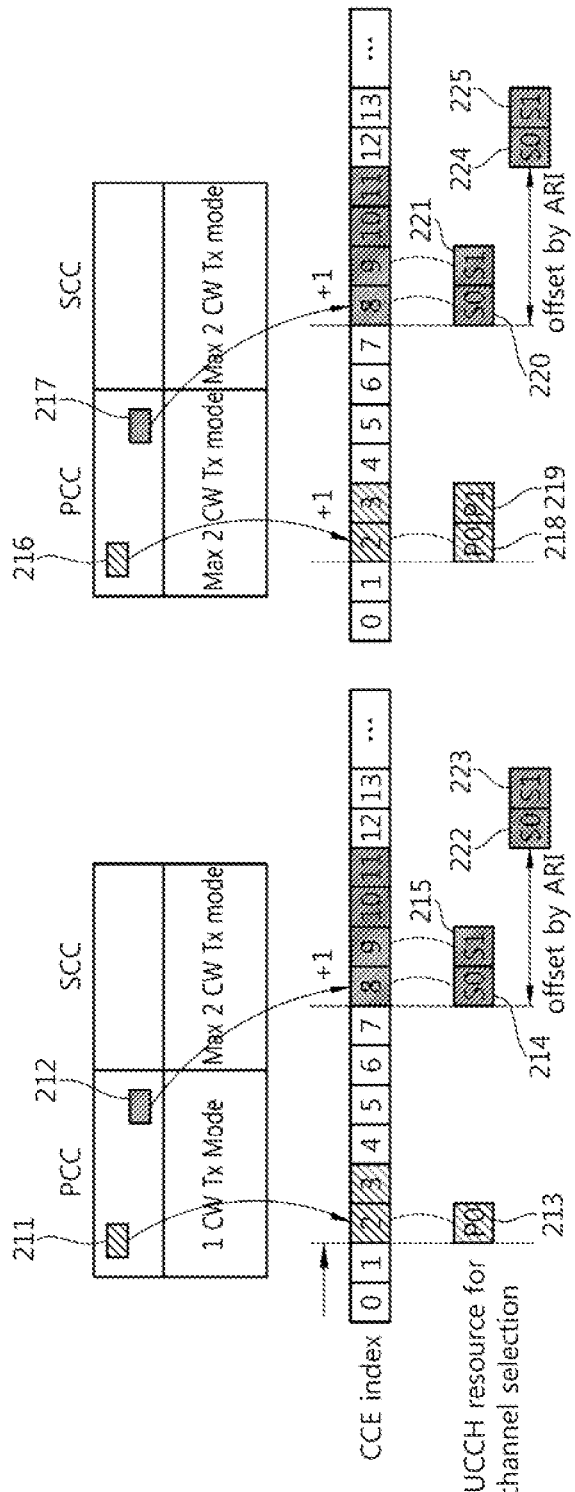
FIG. 11 shows an example of PUCCH resource allocation when two component carriers (CCs) are allocated to a user equipment.

FIG. 11 shows an example of PUCCH resource allocation when two CCs are allocated to a UE.

Referring to FIG. 11(a), a PCC (i.e., DL PCC) is set to a 1-codeword (CW) Tx mode and an SCC (i.e., DL SCC) is set to s 2CW Tx mode. In this case, a CCE index of a PDCCH 211 for scheduling a PDSCH of the PCC may be 2 or 3. Then, one PUCCH resource 213 corresponding to a lowest CCE index of a PDCCH 211 is allocated. In addition, a CCE index of a PDCCH 212 for scheduling a PDSCH of the SCC may be 8, 9, 10, or 11. Then, a PUCCH resource 214 corresponding to a lowest CCE index (i.e., 8) of the PDCCH 212 and a PUCCH resource 215 corresponding to a second lowest CCE index (i.e., 9) are allocated.

Referring to FIG. 11(b), both the PCC and the SCC are set to the 2CW Tx mode. In this case, a lowest CCE index of a PDCCH 216 for scheduling a PDSCH of the PCC and two PUCCH resources 218 and 219 corresponding to a second lowest CCE index can be allocated. A lowest CCE index of a PDCCH 217 for scheduling a PDSCH of the SCC and two PUCCH resources 220 and 221 corresponding to a second lowest CCE index can be allocated.

In FIGS. 11(a) and (b), an ACK/NACK resource indicator (ARI) can be transmitted on the PDCCHs 212 and 217 for scheduling the PDSCH transmitted via the SCC. The ARI is a filed indicating an ACK/NACK resource. If the ARI is present, the UE can apply a value of the ARI as an offset value to a lowest CCE index occupied by the PDCCH. For example, if a value transmitted by using the ARI is 4, the UE can allocate PUCCH resources 222 and 223 (or 224 and 225) corresponding to the PDCCH's lowest CCE index $n_{CCE}$+4.

The UE determines ACK/NACK according to whether a plurality of data units received in the PCC and the SCC are successfully received, and transmits a modulation symbol by selecting one of the allocated PUCCH resources. In this manner, ACK/NACK can be transmitted for the plurality of data units. In TDD, the UE transmits ACK/NACK through a UL subframe of the PCC. In FDD, the UE transmits ACK/NACK through a UL PCC.

Although an example of determining the number of PUCCH resources to be allocated for ACK/NACK transmission according to a Tx mode of each CC, that is, according to whether the Tx mode is a 1CW Tx mode or a 2CW Tx mode, is described in FIG. 11, the present invention is not limited thereto. That is, the PUCCH resource may be allocated independent of the Tx mode of each CC. For example, if ACK/NACK for a PDSCH received in M DL subframes (where M is a natural number greater than 1) is transmitted in one UL subframe in TDD, only one PUCCH resource may be allocated even if a corresponding CC is in the 2CW Tx mode.

The following description is about how to allocate a PUCCH resource when ACK/NACK is transmitted by using transmit diversity in a multiple-carrier system. The transmit diversity implies transmission of the same signal through multiple Tx antennas to improve reliability of transmission. Spatially orthogonal resource transmit diversity (SORTD) is one example of the transmit diversity. The SORTD is a transmit diversity scheme which transmits the same signal by using resources orthogonal to different Tx antennas.

Figure 12:
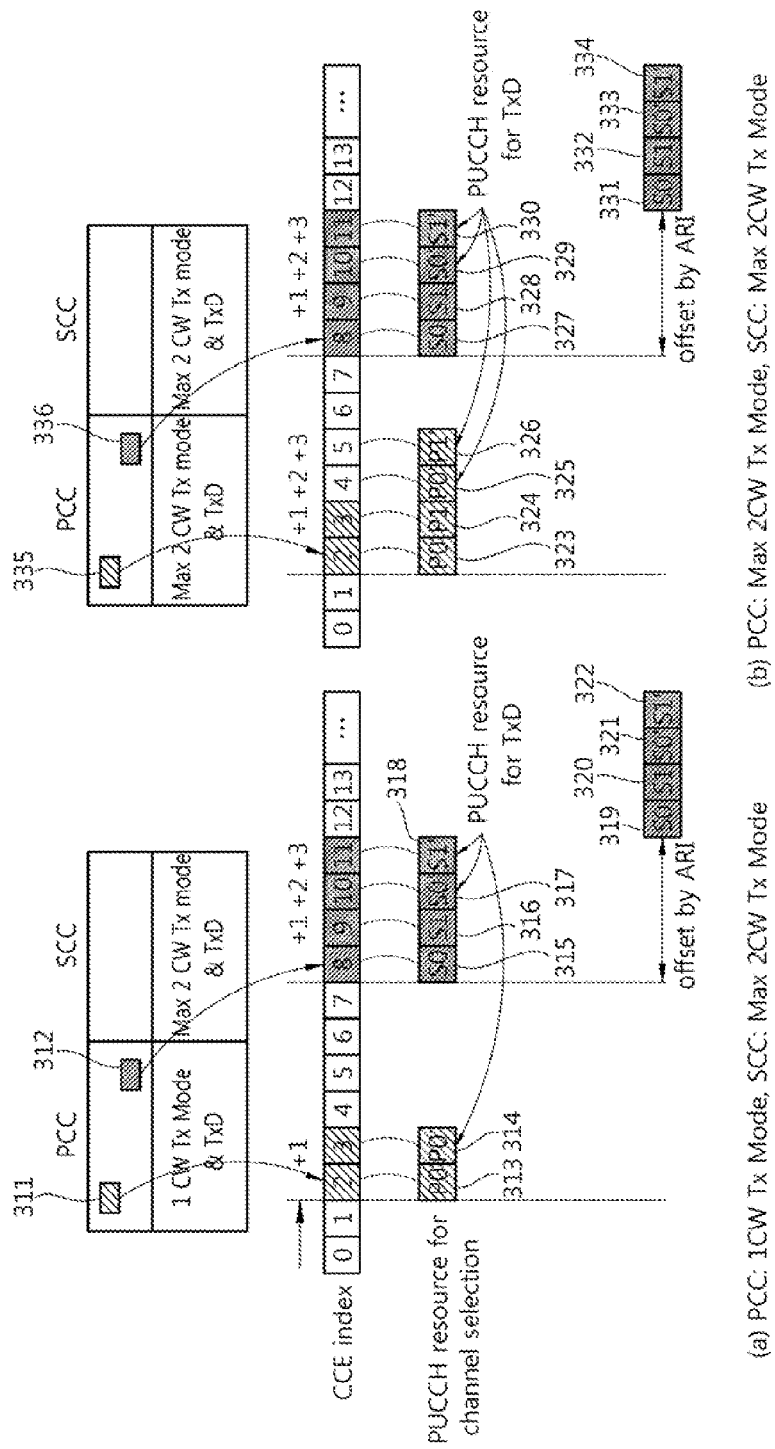
FIG. 12 shows an example of allocating a PUCCH resource to transmit acknowledgement/not-acknowledgement (ACK/NACK) by using spatially orthogonal resource transmit diversity (SORTD) in a multiple-carrier system.

FIG. 12 shows an example of allocating a PUCCH resource to transmit ACK/NACK by using SORTD in a multiple-carrier system.

Referring to FIG. 12(a), a PCC is set to a 1CW Tx mode and an SCC is set to a 2CW Tx mode. A UE allocates two PUCCH resources 313 and 314 corresponding to lowest CCE indices $n_{CCE}$ and $n_{CCE}$+1 of a PDCCH 311 for scheduling a PDSCH of the PCC. In this case, the PUCCH resource 314 corresponding to $n_{CCE}$+1 is a PUCCH resource additionally allocated for SORTD. In this case, the PUCCH resource 313 may be a PUCCH resource implicitly mapped to $n_{CCE}$ in single-antenna transmission, and may be a PUCCH resource for a first Tx antenna. In addition, the PUCCH resource 314 additionally allocated for SORTD may be a PUCCH resource for a second Tx antenna.

The UE allocates four PUCCH resources 315 to 318 corresponding to lowest CCE indices $n_{CCE}$, $n_{CCE}$+1, $n_{CCE}$+2, and $n_{CCE}$+3 of the PUCCH 312 for scheduling a PDSCH of the SCC. In this case, two PUCCH resources 317 and 318 corresponding to $n_{CCE}+2$ and $n_{CCE}+3$ are PUCCH resources additionally allocated for SORTD. The PUCCH resources 315 and 316 may be PUCCH resources implicitly mapped to $n_{CCE}$ and $n_{CCE}+1$ in single antenna transmission, and may be PUCCH resources for a first Tx antenna. In addition, PUCCH resources 317 and 318 additionally allocated for SORTD may be PUCCH resources for a second Tx antenna.

FIG. 12(b) differs from FIG. 12(a) in that the PCC is also set to the 2CW Tx mode. Two PUCCH resources can be allocated to transmit ACK/NACK for two codewords, and when ACK/NACK is transmitted by using SORTD, two PUCCH resources may be additionally required. Two PUCCH resources 325 and 326 corresponding to $n_{CCE}+2$ and $n_{CCE}+3$ are additionally allocated to PUCCH resources according to $n_{CCE}$ which is a lowest CCE index of the PUCCH 335 for scheduling a PDSCH of the PCC.

That is, a PUCCH resource for ACK/NACK multiplexing is sequentially allocated according to $n_{CCE}$, and thereafter an additional PUCCH resource for transmit diversity is allocated.

A PUCCH resource required for ACK/NACK multiplexing based on PUCCH resource selection and a PUCCH resource additionally allocated for SORTD may be determined with an offset value by using an ARI transmitted through a PDCCH. For example, in FIG. 12(a), PUCCH resources corresponding to a CCE index having an offset value corresponding to an ARI value can be allocated according to $n_{CCE}$ similarly to PUCCH resources 319, 320, 321, and 322.

The UE determines ACK/NACK according to whether a plurality of data units received in the PCC and the SCC are successfully received, and transmits a modulation symbol by selecting one of the allocated PUCCH resources. For example, the UE may select PUCCH resources 315 and 317, or may select PUCCH resources 316 and 318, or may select PUCCH resources 313 and 314. One of the two PUCCH resources is for a first Tx antenna, and the other is for a second Tx antenna. 2-bit information based on the same QPSK modulation symbol can be transmitted by using each selected PUCCH resource. In this manner, ACK/NACK for a plurality of data units can be transmitted by using the transmit diversity.

Figure 13:
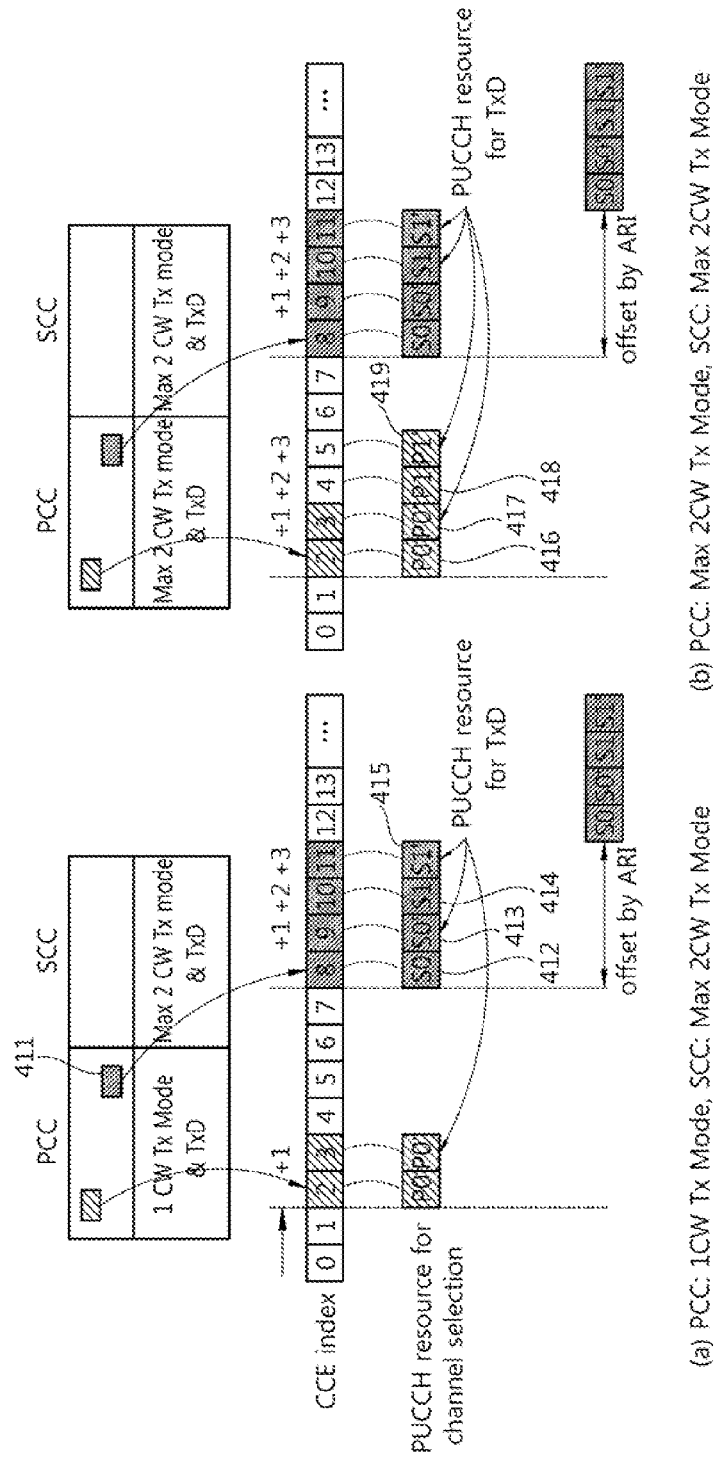
FIG. 13 shows another example of allocating a PUCCH resource to transmit ACK/NACK by using SORTD in a multiple-carrier system.

FIG. 13 shows another example of allocating a PUCCH resource to transmit ACK/NACK by using SORTD in a multiple-carrier system.

FIG. 13(a) differs from FIG. 12(a) in that PUCCH resources for ACK/NACK multiplexing based on channel selection in single antenna transmission are PUCCH resources 412 and 414 corresponding to $n_{CCE}$ and $n_{CCE}+2$. In addition, another difference lies in that PUCCH resources additionally allocated for SORTD are PUCCH resources 413 and 415 corresponding to $n_{CCE}+1$ and $n_{CCE}+3$. That is, PUCCH resources (e.g., 412 and 414) for a first Tx antenna and PUCCH resources (e.g., 413 and 415) for a second Tx antenna have relations of $n_{CCE}+m$ (where, m is 0 or 2) and $n_{CCE}+(m+1)$. FIG. 13(b) differs in that two PUCCH resources 416 and 418 for ACK/NACK multiplexing and additional two PUCCH resources 417 and 419 for transmit diversity are also allocated in the PCC.

The above method can be applied only to a case in which a PDCCH for scheduling a PDSCH transmitted via the PCC or the SCC is transmitted in a UL CC in which ACK/NACK is transmitted, that is, a linked DL CC. For example, the DL CC may be a DL CC included in the PCC.

Figure 14:
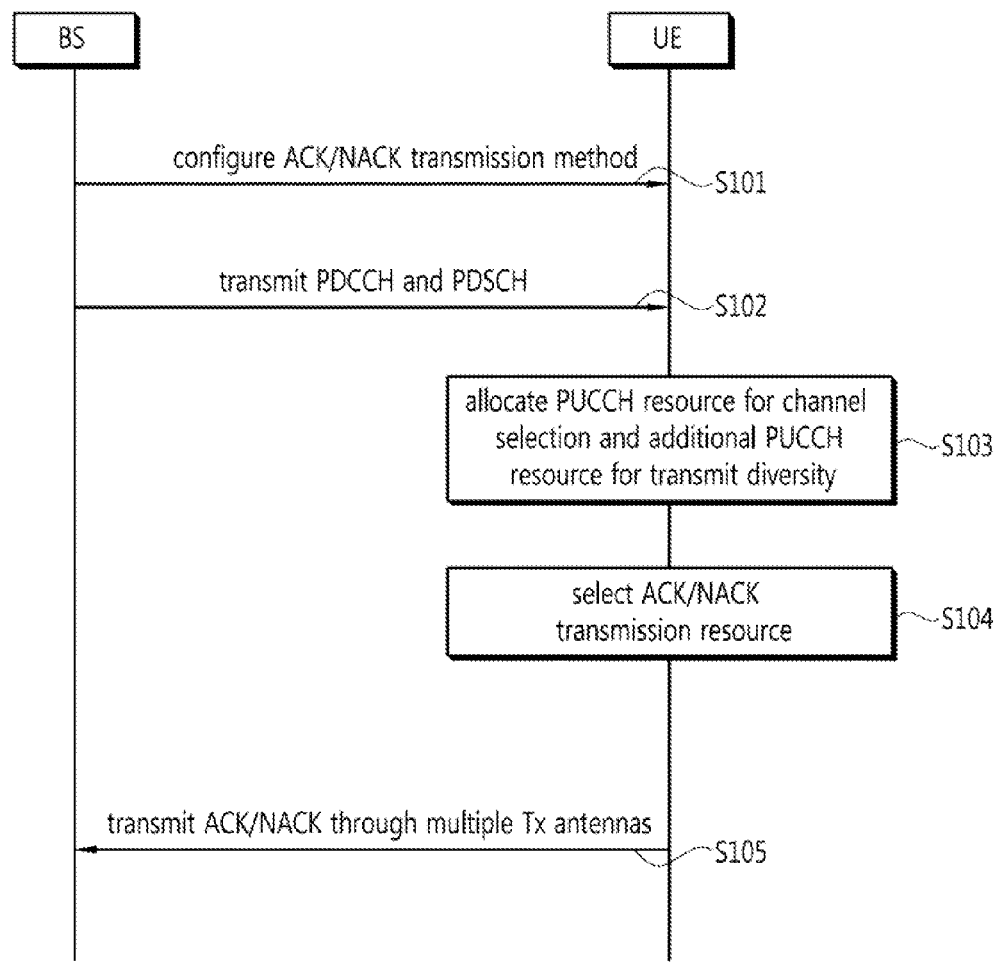
FIG. 14 shows a multiple ACK/NACK transmission method according to an embodiment of the present invention.

FIG. 14 shows a multiple ACK/NACK transmission method according to an embodiment of the present invention.

Referring to FIG. 14, a BS transmits a configuration of an ACK/NACK transmission method to a UE (step S101). For example, the BS can report the ACK/NACK transmission method to the UE by using a higher layer signal such as an RRC signal. The ACK/NACK transmission method may be ACK/NACK bundling and ACK/NACK multiplexing for example. The BS can instruct ACK/NACK multiplexing based on PUCCH resource selection to the UE.

The BS transmits a PDCCH and a PDSCH to the UE (step S102). For example, the BS can transmit a first PDCCH for a PCC and a second PDCCH for an SCC via a PCC. Alternatively, the BS can transmit a first PDSCH via the PCC and can transmit a second PDSCH via the SCC.

The UE allocates an additional PUCCH resource for transmit diversity and a PUCCH resource according to ACK/NACK multiplexing based on PUCCH resource selection (step S103). Such a PUCCH resource allocation method is described above with reference to FIG. 11 to FIG. 13.

The UE selects an ACK/NACK transmission resource (step S104). The UE selects a specific PUCCH resource according to ACK/NACK information to be transmitted among a plurality of allocated PUCCH resources, and maps a QPSK modulation symbol by using the selected PUCCH resource.

The UE transmits ACK/NACK through a plurality of transmit (Tx) antennas (step S105). For example, if the UE has two Tx antennas, the UE can transmit the ACK/NACK by using resources orthogonal to a first Tx antenna and a second Tx antenna. That is, the UE can transmit the ACK/NACK by using a transmit diversity scheme such as SORTD. By using such a transmit diversity scheme, the ACK/NACK can be transmitted with high reliability.

Figure 15:
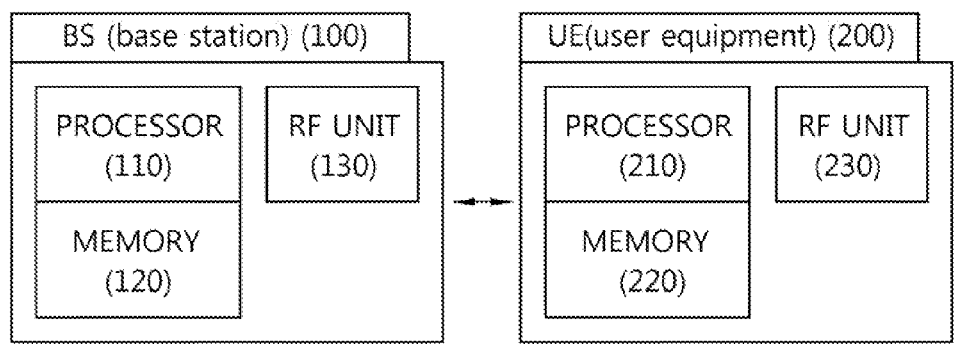
FIG. 15 is a block diagram showing a wireless communication system according to an embodiment of the present invention.

FIG. 15 is a block diagram showing a wireless communication system according to an embodiment of the present invention.

A BS 100 includes a processor 110, a memory 120, and a radio frequency (RF) unit 130. The processor 110 implements the proposed functions, processes, and/or methods. Layers of a radio interface protocol can be implemented by the processor 110. The processor 110 can transmit information regarding a configuration of an ACK/NACK transmission method to a UE, and can transmit a PDCCH and a PDSCH through a plurality of serving cells. In addition, the processor 110 can receive ACK/NACK for a PDSCH. The memory 120 is coupled to the processor 110, and stores a variety of information for driving the processor 110. The RF unit 130 is coupled to the processor 110, and transmits and/or receives a radio signal.

A BS 200 includes a processor 210, a memory 220, and an RF unit 230. The processor 210 implements the proposed functions, processes, and/or methods. Layers of a radio interface protocol can be implemented by the processor 210. The processor 210 receives a PDCCH for a primary cell and a secondary call via the primary cell, and receives a PDSCH scheduled by the PDCCH. The processor 210 determines ACK/NACK for a plurality of PDSCHs, and thereafter allocates a PUCCH resource for the ACK/NACK. The processor 210 selects a PUCCH resource according to ACK/NACK contents among the allocated PUCCH resources, and maps a QPSK symbol. Further, the processor 210 feeds back the ACK/NACK to the BS via the primary cell or a serving cell linked to a serving cell in which the PDCCH is received. The memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, and/or a data processing unit. The memories 120 and 220 may include a read-only memory (ROM), a random access memory (RAM), a flash memory, a memory card, a storage medium, and/or other equivalent storage devices. The RF units 130 and 230 may include a base-band circuit for processing a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means. Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The aforementioned embodiments include various exemplary aspects. Although all possible combinations for representing the various aspects cannot be described, it will be understood by those skilled in the art that other combinations are also possible. Therefore, all replacements, modifications and changes should fall within the spirit and scope of the claims of the present invention.

The invention claimed is:

1. A method of transmitting acknowledgement/not-acknowledgement (ACK/NACK) of a user equipment (UE) to which a plurality of serving cells are configured in a wireless communication system, the method comprising:
   receiving a first physical downlink control channel (PDCCH) and a second PDCCH through at least one serving cell among the plurality of serving cells;
   receiving a first physical downlink shared channel (PDSCH) scheduled by the first PDCCH;
   receiving a second PDSCH scheduled by the second PDCCH;
   allocating at least one first physical uplink control channel (PUCCH) resource on the basis of a lowest index of a control channel element (CCE) on which the first PDCCH is transmitted;
   allocating at least one second PUCCH resource on the basis of another lowest index of a CCE on which the second PDCCH is transmitted; and
   transmitting ACK/NACK for the first PDSCH and the second PDSCH through a first serving cell linked to a serving cell where the UE has received the first PDCCH and the second PDCCH,
   wherein a transmission resource for transmitting the ACK/NACK is selected from the at least one first PUCCH resource and the at least one second PUCCH resource.

2. The method of claim 1, wherein the at least one first PUCCH resource and the at least one second PUCCH resource each include a PUCCH resource configured when the user equipment transmits the ACK/NACK through a single antenna and another PUCCH resource additionally configured when the user equipment transmits the ACK/NACK through multiple antennas.

3. The method of claim 2, wherein a number of the another PUCCH resource additionally configured when the ACK/NACK is transmitted through the multiple antennas is the same as a number of the PUCCH resource configured when the ACK/NACK is transmitted through the multiple antennas.

4. The method of claim 1, wherein if the lowest index of the CCE on which the first PDCCH is transmitted is $n_{CCE}$, the at least one first PUCCH resource includes a PUCCH resource 1 corresponding to $n_{CCE}$ and a PUCCH resource 2 corresponding to $(n_{CCE}+1)$.

5. The method of claim 4, wherein if the at least one first PUCCH resource is selected as a transmission resource of the ACK/NACK and if the ACK/NACK is transmitted simultaneously through a first antenna and a second antenna, the first antenna transmits the ACK/NACK by using the PUCCH resource 1 and the second antenna transmits the ACK/NACK by using the PUCCH resource 2.

6. The method of claim 1, wherein if the lowest index of the CCE on which the first PDCCH is transmitted is $n_{CCE}$, the at least one first PUCCH resource includes a PUCCH resource 1 corresponding to $n_{CCE}$, a PUCCH resource 2 corresponding to $(n_{CCE}+1)$, a PUCCH resource 3 corresponding to $(n_{CCE}+2)$, and a PUCCH resource 4 corresponding to $(n_{CCE}+3)$.

7. The method of claim 6, wherein if the at least one first PUCCH resource is selected as a transmission resource of the ACK/NACK and if the ACK/NACK is transmitted simultaneously through a first antenna and a second antenna, the first antenna transmits the ACK/NACK by using any one of the PUCCH resource 1 and 2, and the second antenna transmits the ACK/NACK by using any one of the PUCCH resource 3 and 4.

8. The method of claim 6, wherein if the at least one first PUCCH resource is selected as a transmission resource of the ACK/NACK and if the ACK/NACK is transmitted simultaneously through a first antenna and a second antenna, the first antenna transmits the ACK/NACK by using any one of the PUCCH resource 1 and 3, and the second antenna transmits the ACK/NACK by using any one of the PUCCH resource 2 and 4.

9. The method of claim 1, wherein if the another lowest index of the CCE on which the second PDCCH is transmitted is $n_{CCE}$, the at least one second PUCCH resource includes a PUCCH resource 1 corresponding to $n_{CCE}$ and a PUCCH resource 2 corresponding to $(n_{CCE}+1)$.

10. The method of claim 9, wherein if the at least one second PUCCH resource is selected as a transmission resource of the ACK/NACK and if the ACK/NACK is transmitted simultaneously through a first antenna and a second antenna, the first antenna transmits the ACK/NACK by using the PUCCH resource 1 and the second antenna transmits the ACK/NACK by using the PUCCH resource 2.

11. The method of claim 1, wherein if the lowest index of the CCE on which the second PDCCH is transmitted is $n_{CCE}$, the at least one second PUCCH resource includes a PUCCH resource 1 corresponding to $n_{CCE}$, a PUCCH resource 2 corresponding to $(n_{CCE}+1)$, a PUCCH resource 3 corresponding to $(n_{CCE}+2)$, and a PUCCH resource 4 corresponding to $(n_{CCE}+3)$.

12. The method of claim 11, wherein if the at least one second PUCCH resource is selected as a transmission resource of the ACK/NACK and if the ACK/NACK is transmitted simultaneously through a first antenna and a second antenna, the first antenna transmits the ACK/NACK by using any one of the PUCCH resource 1 and 2, and the second antenna transmits the ACK/NACK by using any one of the PUCCH resource 3 and 4.

13. The method of claim 11, wherein if the at least one second PUCCH resource is selected as a transmission resource of the ACK/NACK and if the ACK/NACK is transmitted simultaneously through a first antenna and a second antenna, the first antenna transmits the ACK/NACK by using any one of the PUCCH resource 1 and 3, and the second antenna transmits the ACK/NACK by using any one of the PUCCH resource 2 and 4.

14. The method of claim 1, wherein the transmission resource for transmitting the ACK/NACK is used to transmit a modulation symbol modulated using quadrature phase shift keying (QPSK).

15. A user equipment comprising:
- a radio frequency (RF) unit for transmitting and receiving a radio signal; and
- a processor coupled to the RF unit,
- wherein the processor is configured to:
  - receive a first physical downlink control channel (PDCCH) and a second PDCCH through at least one serving cell among the plurality of serving cells;
  - receive a first physical downlink shared channel (PDSCH) scheduled by the first PDCCH;
  - receive a second PDSCH scheduled by the second PDCCH;
  - allocate at least one first physical uplink control channel (PUCCH) resource on the basis of a lowest index of a control channel element (CCE) on which the first PDCCH is transmitted;
  - allocate at least one second PUCCH resource on the basis of another lowest index of a CCE on which the second PDCCH is transmitted; and
  - transmit ACK/NACK for the first PDSCH and the second PDSCH through a first serving cell linked to a serving cell where the UE has received the first PDCCH and the second PDCCH,
- wherein a transmission resource for transmitting the ACK/NACK is selected from the at least one first PUCCH resource and the at least one second PUCCH resource.

* * * * *